United States Patent [19]
Jackson et al.

[11] Patent Number: 5,335,335
[45] Date of Patent: Aug. 2, 1994

[54] MULTIPROCESSOR CACHE SNOOP ACCESS PROTOCOL WHEREIN SNOOP MEANS PERFORMS SNOOPING OPERATIONS AFTER HOST BUS CYCLE COMPLETION AND DELAYS SUBSEQUENT HOST BUS CYCLES UNTIL SNOOPING OPERATIONS ARE COMPLETED

[75] Inventors: Mike T. Jackson, Houston; Jeffrey C. Stevens, Spring; Roger E. Tipley, Houston, all of Tex.

[73] Assignee: Compaq Computer Corporation, Houston, Tex.

[21] Appl. No.: 753,420

[22] Filed: Aug. 30, 1991

[51] Int. Cl.5 ............................................. G06F 12/00
[52] U.S. Cl. .................................... 395/425; 395/400; 364/DIG. 1; 364/229.2; 364/243.44; 364/243.41
[58] Field of Search .............................. 395/400, 425; 364/200 MS File, 900 MS File

[56] References Cited

U.S. PATENT DOCUMENTS

| | | | |
|---|---|---|---|
| 4,843,542 | 6/1989 | Dashiell et al. | 395/425 |
| 4,928,225 | 5/1990 | McCarthy et al. | 395/425 |
| 4,959,777 | 9/1990 | Holman, Jr. | 395/325 |
| 5,056,002 | 10/1991 | Watanabe | 395/425 |
| 5,097,409 | 3/1992 | Schwartz et al. | 395/425 |
| 5,113,514 | 5/1992 | Albonesi et al. | 395/425 |
| 5,131,081 | 7/1992 | MacKenna et al. | 395/275 |
| 5,146,603 | 9/1992 | Frost et al. | 395/425 |
| 5,155,824 | 10/1992 | Edenfield et al. | 395/425 |
| 5,170,476 | 12/1992 | Laasko et al. | 395/425 |
| 5,193,163 | 3/1993 | Sanders et al. | 395/425 |
| 5,195,089 | 3/1993 | Sindhu et al. | 370/85.1 |

OTHER PUBLICATIONS

James Archibald and Jean-Loup Baer, "An Evaluation of Cache Coherence Solutions in Shared-Bus Multiprocessors," Oct. 18, 1985, pp. 1-32.
Paul Sweazey and Alan Jay Smith, "A Class of Compatible Cache Consistencey Protocols and their Support by the IEEE Futurebus," 13th International Symposium on Computer Architecture 1986, pp. 414-423.
James R. Goodman, "Using Cache Memory to Reduce Processor-Memory Traffic," 1983, pp. 124-131.

Primary Examiner—Joseph L. Dixon
Assistant Examiner—Frank J. Asta
Attorney, Agent, or Firm—Pravel, Hewitt, Kimball & Krieger

[57] ABSTRACT

A method and apparatus for enabling a dual ported cache system in a multiprocessor system to guarantee snoop access to all host bus cycles which require snooping. The cache controller includes a set of latches coupled to the host bus which it uses to latch the state of the host bus during a snoop cycle if the cache controller is unable to immediately snoop that cycle. The cache controller latches that state of the host bus in the beginning of a cycle and preserves this state throughout the cycle due to the effects of pipelining on the host bus. In addition, the cache controller is able to delay host bus cycles to guarantee snoop access to host bus cycles which require snooping. The cache controller generally only delays a host bus cycle when it is already performing other tasks, such as servicing its local processor, and cannot snoop the host bus cycle immediately. When the cache controller latches the state of the bus during a write cycle, it only begins to delay the host bus after a subsequent cycle begins. In this manner, one write cycle can complete on the host bus before the cache controller delays any cycles, thereby reducing the impact of snooping on host bus bandwidth. Read cycles are always delayed until the cache controller can complete the snooping operation because the cache may be the owner of the data and a write back cycle may be necessary.

12 Claims, 6 Drawing Sheets

MULTIPROCESSOR CACHE SNOOP ACCESS PROTOCOL WHEREIN SNOOP MEANS PERFORMS SNOOPING OPERATIONS AFTER HOST BUS CYCLE COMPLETION AND DELAYS SUBSEQUENT HOST BUS CYCLES UNTIL SNOOPING OPERATIONS ARE COMPLETED

BACKGROUND OF THE INVENTION

1. Field of the Invention

The present invention relates to microprocessor cache subsystems in computer systems, and more specifically to methods for guaranteeing snoop access in a multiprocessor write-back cache environment with minimal effect on system speed.

2. Description of the Prior Art

The personal computer industry is a vibrant and growing field that continues to evolve as new innovations occur. The driving force behind this innovation has been the increasing demand for faster and more powerful computers. Historically, computer systems have developed as uniprocessor, sequential machines which can execute one instruction at a time. However, performance limits are being reached in single processor computer systems, and therefore a major area of research in computer system architecture is multiprocessing. Multiprocessing involves a computer system which includes multiple processors that work in parallel on different problems or different parts of the same problem. The incorporation of multiple processors in a computer system introduces many design problems that are not encountered in single processor architectures. One difficulty that has been encountered in multiprocessing architectures is the maintenance of cache coherency when each processor includes its own local cache. Therefore, one area of research in multiprocessor architectures has been methods and techniques to maintain cache coherency between multiple caches in a multiprocessor architecture.

Cache memory was developed in order to bridge the gap between fast processor cycle times and slow memory access times. A cache is a small amount of very fast, and expensive, zero wait state memory that is used to store a copy of frequently accessed code and data from main memory. A microprocessor can operate out of this very fast memory and thereby reduce the number of wait states that must be interposed during memory accesses. When the processor requests data from memory and the data resides in the cache, then a cache read hit takes place, and the data from the memory access can be returned to the processor from the cache without incurring wait states. If the data is not in the cache, then a cache read miss takes place, and the memory request is forwarded to the system and the data is retrieved from main memory, as would normally be done if the cache did not exist. On a cache miss, the data that is retrieved from memory is provided to the processor and is also written into the cache due to the statistical likelihood that this data will be requested again by the processor.

An efficient cache yields a high "hit rate", which is the percentage of cache hits that occur during all memory accesses. When a cache has a high hit rate, the majority of memory accesses are serviced with zero wait states. The net effect of a high cache hit rate is that the wait states incurred on a relatively infrequent miss are averaged over a large number of zero wait state cache hit accesses, resulting in an average of nearly zero wait states per access. Also, since a cache is usually located on the local bus of its respective microprocessor, cache hits are serviced locally without requiring use of the memory bus, also referred to as the host bus. In the description that follows, the host bus is the bus shared by the microprocessors and the random access memory in the computer system. Each of the various processors can operate out of its local cache when it does not have control of the host bus, thereby increasing the efficiency of the computer system. In systems without microprocessor caches, each of the processors generally must remain idle while it does not have control of the host bus. This reduces the overall efficiency of the computer system because the processors cannot do any useful work at this time. However, if each of the processors includes a cache placed on its local bus, each processor can retrieve the necessary code and data from its cache to perform useful work while other processors or devices have control of the host bus, thereby increasing system efficiency. Thus, processors operating out of their local cache in a multiprocessing environment have a much lower "bus utilization." This reduces system bus bandwidth used by each of the processors, making more bandwidth available for other processors and bus masters.

Cache management is generally performed by a device referred to as a cache controller. A principal cache management responsibility in multiprocessor systems is the preservation of cache coherency. The type of cache management policy used to maintain cache coherency in a multiprocessing system generally depends on the architecture used. One type of architecture commonly used in multiprocessing systems is referred to as a bus-based scheme. In a bus-based scheme, system communication takes place through a shared bus, and this allows each cache to monitor other cache's requests by watching or snooping the bus. Each processor has a cache which monitors activity on the bus and in its own processor and decides which blocks of data to keep and which to discard in order to reduce bus traffic. Requests by a processor to modify a memory location that is stored in more than one cache requires bus communication in order for each copy of the corresponding line to be marked invalid or updated to reflect the new value.

Various types of cache coherency protocols can be employed to maintain cache coherency in a multiprocessor system. One type of cache coherency protocol that is commonly used is referred to as a write-through scheme. In a write-through scheme, all cache writes or updates are simultaneously written into the cache and to main memory. Other caches on the bus must monitor bus transactions and invalidate any matching entries when the memory block is written through to main memory. In a write-back scheme, a cache location is updated with the new data on a processor write hit, and main memory is generally only updated when the updated data block must be exchanged with a new data block.

Multiprocessor cache systems which employ a write-back scheme generally utilize some type of ownership protocol to maintain cache coherency. In this scheme, any copy of data in a cache must be identical to (or actually be) the owner of that location's data. The owner of a location's data is generally defined as the respective location having the most recent version of the data residing in the respective memory location. Ownership is generally acquired through special read and write operations defined in an ownership protocol.

One example of an ownership protocol is referred to as the Berkeley ownership protocol.

The Berkeley protocol is discussed briefly below in order to understand the various snooping and broadcasting requirements in a multiprocessor write-back cache protocol. The Berkeley protocol was designed for shared bus multiprocessor systems to minimize the bus utilization required to maintain cache coherency without additional memory system or bus design. All that is generally required to support the Berkeley protocol are extra signals to support special communication among the caches.

The cache controller includes a directory that holds an associated entry for each data entry or set in the cache. In multiprocessor architectures, this entry generally includes two components: a tag and a number of tag state bits for each of the respective lines in each cache set. The tag acts as a main memory page number, and it holds the upper address bits of the particular page in main memory from which the copy of data residing in the respective set of the cache originated. The tag state bits determine the status of the data in the respective set of the cache. In the Berkeley protocol, the possible states of a cache entry are: invalid, unowned, exclusively owned, or shared owned.

In the Berkeley protocol, copies of a memory block or line can reside in more than one cache, but only one cache can own a line, and the owner is the only cache allowed to update it. Owning a block also obligates the owner to provide the data to other requesting caches and to update main memory when the line is replaced in the cache. If the state of a block is exclusively owned, the owning cache holds the only cached copy of the block, which is updated locally without informing the other caches. If the state of a block is shared owned, other caches may have copies and must be informed about updates to the block. If the state of a block is unowned, several caches may have copies of the block, which cannot be written locally without acquiring ownership first. The invalid state indicates that the cache entry does not contain useful data.

The bus operations used in the Berkeley protocol are as follows:

1. Read-shared. This is a conventional read that gives a cache an owned copy of a block from a cache owner or from main memory.

2. Write. This is a conventional write that causes main memory to be updated and all cached copies to be invalidated. It can be issued only by I/O devices and other bus users without caches.

3. Read for ownership. This is like a conventional read except that the cache doing the read becomes the exclusive owner while matching entries in other caches are invalidated.

4. Write for invalidation. This operation updates a block in a cache, invalidates other cached copies, but does not update main memory. This is done later when the owned updated block is replaced from its cache.

5. Write without invalidation. This operation is used for flushing owned blocks to memory so that main memory is updated, but any other cached copies are kept valid.

The Berkeley Protocol reduces bus traffic when modified data is shared by having the cache that owns the block provide the data on external read requests and by postponing the memory update until the block is actually replaced. The Berkeley Protocol is implemented by the cache controller. The cache controller is primarily responsible for its own processor's use of the cache, but it also assists in maintaining cache coherency by updating the state of a cache block whenever it obtains or relinquishes ownership. The cache controller also includes a snooping mechanism which is responsible for monitoring the host bus and responding to the requests of other processors.

The action of the cache controller depends on the type of data access request from its processor, whether the data is in the cache, and in the case of a cache hit, on the state of the cache entry. In processor reads, there may be a cache hit or a cache miss. If there is a hit, the required data is provided to the processor. If there is a miss, the controller selects a cache entry to be replaced, flushing its data back to memory with a write-without-invalidation cycle if the replaced entry is owned. It then issues a read-shared cycle for the desired block and declares its state to be unowned.

In processor writes, when there is a cache hit and if the entry is exclusively owned, the processor writes to it without broadcasting the write on the bus. If the entry is shared owned or unowned, the cache controller sends a write-for-invalidation signal to the snooping mechanisms of other cache controllers before it modifies the block so that the other caches can invalidate their matching entries. When a cache write miss occurs and a block must be chosen for replacement, if the chosen block is owned, it is written to memory using a write-without-invalidation cycle. The requested block is then read with a read-for-ownership operation and updated, and its state becomes exclusively owned.

The snooping mechanism in a cache controller monitors the bus for accesses (reads and writes) from other processors. In external read requests, it accesses its cache memory to supply owned blocks and, in writes, it invalidates blocks in its cache memory written by another processor. If the read request by the other processor is a read-shared operation, it changes the entry's state to shared owned, and if the read request is a read-for-ownership operation, the state is changed to invalid.

The actions of the snooping mechanism depend on the type of system bus request, whether the request results in a hit or miss in its cache, and the state of the entry in its cache. If the bus request detected by the snooping mechanism is a read, it first determines whether the block is in its own cache. If not, no action is necessary. If there is a hit, the sequence of actions depends on the type of read (read-shared or read-ownership) and the state of the block hit (exclusively owned, shared owned, or unowned). A hit on a block marked invalid is treated as a miss.

If the block is owned, the snooping mechanism must inhibit memory from responding to the bus request and instead provide the data to the requesting processor or device. For a block that is exclusively owned, the snooping mechanism must first obtain sole use of the cache memory before responding to prevent the local processor from attempting to simultaneously update the entry. If the bus request is a read-for-ownership, then the snooping mechanism must invalidate its copy. If the bus cycle is a read-shared cycle, the snooping mechanism changes the block's state to shared owned if it was previously exclusively owned. If the bus request detected by the snooping mechanism is a write-for-invalidation cycle and if there is a cache hit, the snooping mechanism must invalidate the copy in its cache. If the write is a write-without-invalidation cycle, then another processor is flushing its cache, and no action is required.

In addition to snooping processor cycles, the snooping mechanism must also monitor the host bus when an I/O device situated on a separate I/O bus is performing cycles on the host bus for cache coherency reasons.

As discussed above, in a multiprocessor architecture a cache controller generally must be able to service its local processor while also snooping the host bus. This requires that a cache system in a multiprocessor system have some type of dual ported scheme. In one dual ported scheme, the cache system can service accesses from both the local processor and the host bus, but only one access to the cache system can be made at a time. This scheme is desirable because it prevents the local processor and the snooping mechanism in the cache controller from both updating a cache entry at the same time, thereby preventing cache coherency problems from occurring.

The fact that only one access to the cache system can be made at a time may result in problems if the cache system is servicing its local processor and a snoop access is requested. Problems may also arise in a writeback cache environment using this scheme if both a local processor access and a host bus snoop request occur at the same time. For cache coherency reasons, it is important that all snoop accesses on the host bus be serviced immediately by the cache system so that no snoop accesses are lost. However, it is possible that several consecutive zero-wait-state writes could occur on the host bus while the cache is servicing its local processor, possibly causing the cache to miss one of the writes. The cache system may not gain access to the host bus in time to snoop the access. If the local processor allows for processor cycle aborts, then the cache generally can simply abort the processor cycle and immediately service the snoop request. However, many popular microprocessors do not allow for processor cycle aborts, one such notable processor being the Intel Corporation 80386 microprocessor. If the local processor does not allow for processor cycle aborts, then it is possible that the cache system would not gain access to the host bus in time to snoop the bus cycle. Therefore, a method and apparatus is needed to allow a cache to have some control over the cycles of another bus master or cache system running on the host bus in order to guarantee that the cache system has access to all host bus cycles for snooping purposes.

SUMMARY OF THE INVENTION

The present invention comprises a method and apparatus for enabling a cache controller in a multiprocessor system to guarantee snoop access to all host bus cycles which require snooping. The cache controller according to the present invention includes a set of internal latches and latchable transceivers coupled to the host bus which it uses to latch the state of the host bus during a snoop cycle if the cache controller is unable to immediately snoop that cycle. The cache controller latches the state of the host bus in the beginning of the cycle due to the effects of pipelining on the host bus. In this manner, the cache controller preserves the state of the bus during a snoop cycle that it was unable to immediately snoop in order to provide it with more time to snoop the cycle. In addition, the cache controller is able to delay host bus cycles to guarantee snoop access to host bus cycles which require snooping. Each cache controller according to the present invention may generate a pause signal during a host bus cycle to prevent the cycle from completing. In the preferred embodiment, a cache controller generally only delays a host bus cycle when it is already performing other tasks, such as servicing its local processor, and cannot snoop the host bus cycle immediately.

The cache controller latches the host bus address and data signals on a snoop write cycle and latches only the address signals on a snoop read cycle. When the cache controller latches the state of a snoop write cycle, the cache controller only begins to delay the host bus after a subsequent cycle begins to prevent the subsequent cycle from completing. This allows the cache controller more time to snoop the write cycle. In this manner, the cache controller can allow a current write cycle which needs to be snooped to complete before it is forced to delay the host bus, thereby reducing the impact of snooping on host bus bandwidth. When the cache controller latches the state of a snoop read cycle, the cache controller does not allow the current snoop read cycle to complete until it has been able to snoop the cycle. This is because the cache controller might own a modified copy of the requested data and hence need to inhibit the current memory cycle and provide the modified copy of data to the requesting device. The cache controller latches the state of the read cycle at the beginning of the cycle because the address signals may change during the cycle due to pipelining on the host bus. Therefore, by latching read snoop cycles, the cache controller has the entire cycle, and more if a delay is added, in which to snoop the cycle.

Therefore, a method and apparatus for enabling a cache controller in a multiprocessor system to guarantee snoop access to all host bus cycles which require snooping is disclosed. The cache controller latches the state of the host bus when it cannot immediately snoop a cycle and then delays current or subsequent cycles, if necessary, to guarantee snoop access. By latching the state of the host bus, the impact of snooping on bus bandwidth is reduced.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

The following related disclosures are herein incorporated by reference:

U.S. application Ser. No. 07/753,199 entitled "Multiprocessor Cache Arbitration" by Stevens ET AL, filed on Aug. 30, 1991; and U.S. application Ser. No. 07/752,761 entitled "LRU and Cache Write Tag RAM Protocol" by Tipley ET AL, filed on Aug. 30, 1991, both of which are assigned to the same assignee as this invention.

Figure 1:
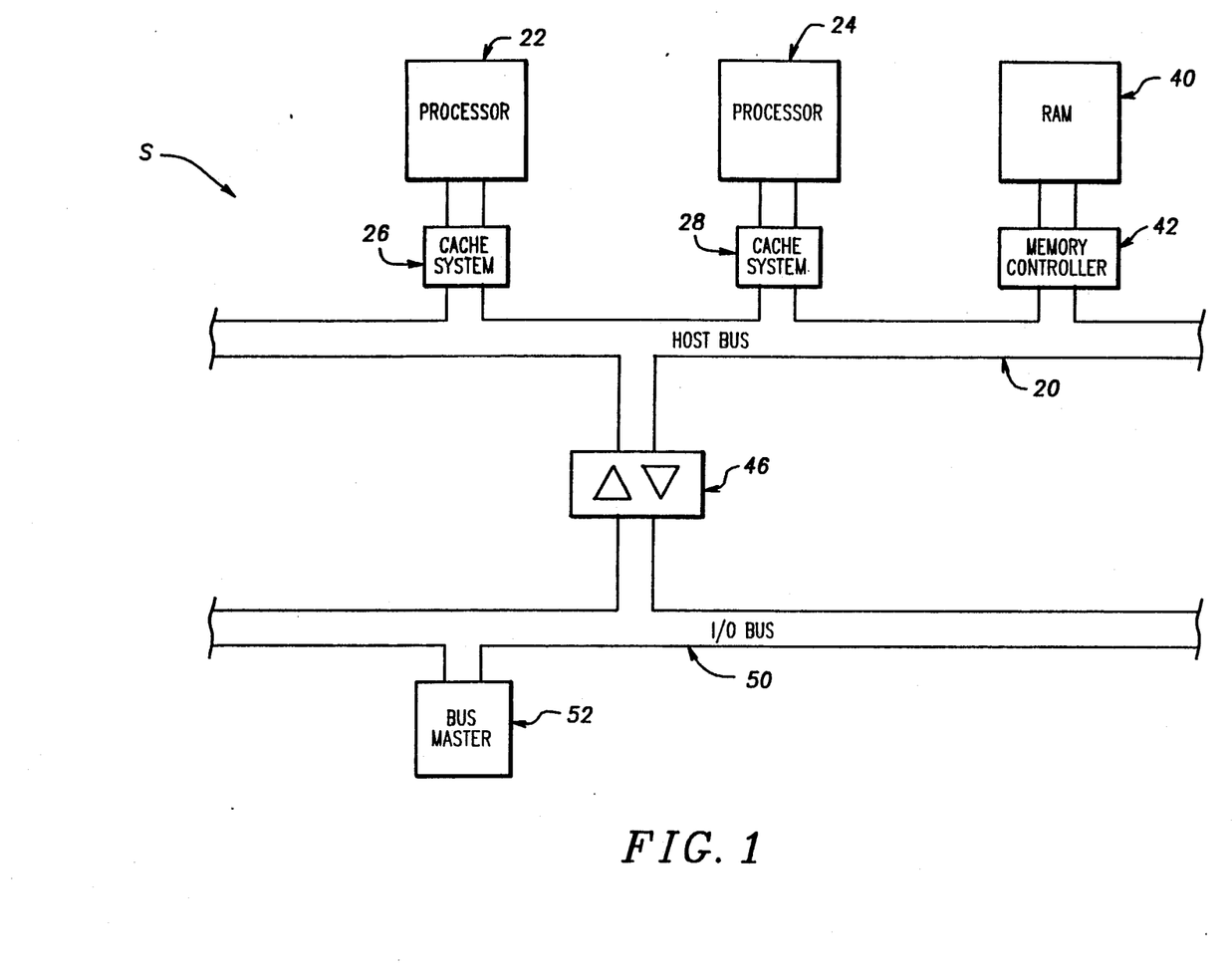
FIG. 1 is a block diagram of a multiprocessor computer system including multiple caches according to the present invention.

Referring now to FIG. 1, a computer system S is generally shown. Many of the details of a computer system that are not relevant to the present invention have been omitted for the purpose of clarity. In the present embodiment, the computer system S includes two microprocessors 22 and 24 that are coupled to a host bus 20. However, the use of a greater number of microprocessors is also contemplated. The processors 22 and 24 preferably pipeline bus cycles on the host bus 20. Each of the processors 22 and 24 have an associated cache subsystem 26 and 28, respectively, coupled between the processors 22 and 24 and the host bus 20. Each of the cache subsystems 26 and 28 preferably include internal latches, latchable transceivers, and host bus pause circuitry according to the present invention. Random access memory (RAM) or main memory 40 is preferably coupled to the host bus 20 through a system memory controller 42, which controls the operation of the RAM 40. The memory controller 42 generates a ready signal to signify completion of cycles on the host bus 20. The host bus 20 includes a data bus, a control bus, and an address bus. The host address bus preferably includes address signals referred to as A<31:2> as well as four byte enable signals referred to BE<3:0>*. The control bus includes a memory-input/output signal referred to as MIO, a data/control signal referred to as DC, and a write/read signal referred to as WR, among others.

The host bus 20 is preferably coupled to an input/output (I/O) bus 50 through transceivers 46. The I/O bus 50 is preferably based on the Extended Industry Standard Architecture (EISA). EISA is an extension of the Industry Standard Architecture, a bus architecture introduced in the International Business Machines (IBM) PC/AT personal computer. However, the I/O bus 50 may be based on any of the various bus specifications. An ISA or EISA bus master 52 is preferably connected to the I/O bus 50. The bus master 52 may be any of the type that controls the host bus 20 when the processors 22 and 24 are on hold, such as the system direct memory access (DMA) controller, a hard disk interface, a local area network (LAN) interface or a video graphics processor system.

Figure 2:
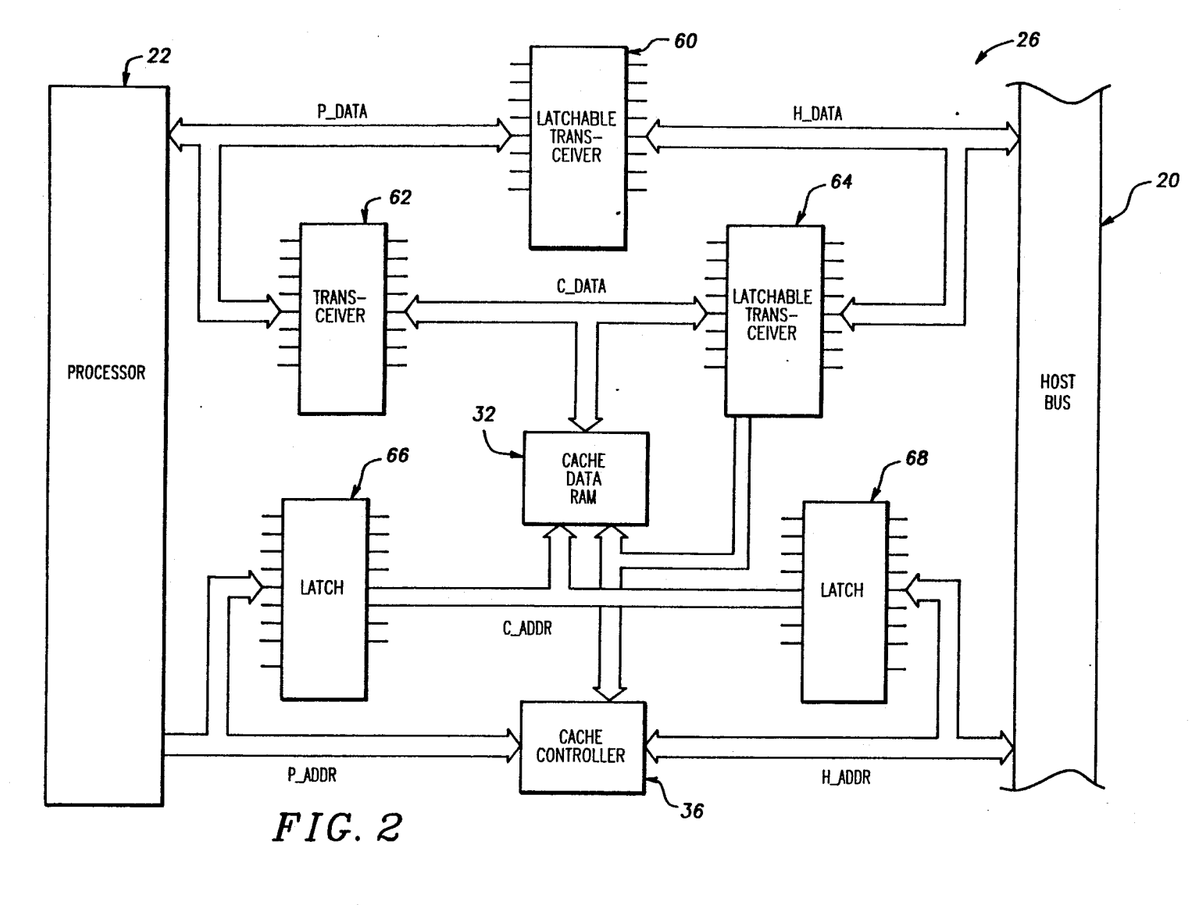
FIG. 2 depicts the data and address path organization of a microprocessor cache system of FIG. 1 including latchable transceivers according to the present invention.

The cache subsystems 26 and 28 are identical in the preferred embodiment, and in the following discussion the cache subsystem 26 is described for simplicity. Referring now to FIG. 2, a block diagram of the cache subsystem 26 coupled to the processor 22 is shown. The cache subsystem 26 includes a cache data RAM 32 and a cache controller 36. The cache data RAM 32 is preferably organized as a two way set associative cache having ways referred to as WAY 0 and WAY 1. The cache controller 36 includes tag RAM's (not shown) which are used to determine if blocks of data reside in respective ways in the cache 32, as is well known to those skilled in the art. The block diagram illustrates the address and data paths to the cache data RAM 32 in the cache subsystem 26. The cache subsystem 26 has a dual ported nature in that the cache data RAM 32 and the tag RAM's in the cache controller 36 can be accessed either by the local processor 22 or by a snoop cycle on the host bus 20. The cache subsystem 26 includes a latchable transceiver 60 located in the data path from the host bus 20 to the processor 22. The cache subsystem 26 includes two 32-bit transceivers 62 coupled in the data path between the processor 22 and the cache data RAM 32. The cache subsystem 26 also includes two 32-bit latchable transceivers 64 according to the present invention coupled in the data path between the cache data RAM 32 and the host bus 20. Latchable transceivers 64 are included in the data path between the cache data RAM 32 and the host bus 20 to enable the cache controller 36 to latch the data on the host bus 20 during snoop write cycles. This is necessary because the respective data location where the snoop write hit occurs may be designated as modified, requiring that the new data on the host bus 20 be written into the respective data location in the cache. Therefore, data on the host bus 20 is latched during a snoop write cycle because of the possibility of a snoop write hit to a modified location, which would require that the latched data be written into a respective cache way. If a snoop write miss occurs or if the snoop write hit is not to a modified location, then the data stored in the latchable transceiver 64 is ignored. The latchable transceivers 64 are controlled by logic in the cache controller 36 as is explained below.

Two 32-bit transceivers 62 and two 32-bit latchable transceivers 64 are included in the respective data paths in the cache subsystem 26 because the cache data RAM 32 includes two cache ways. Each of the two respective transceivers 62 and latchable transceivers 64 are coupled to a respective cache way. Only the outputs of one of the two 32-bit transceivers 62 or latchable transceivers 64 are enabled at any one time, depending on which cache way is sending or receiving data.

The cache subsystem 26 also includes a pair of 8-bit latches 66 and 68 coupled in the address path to the cache data RAM 32 between the host bus 20 and the processor 22. The latches 66 and 68 are used to latch the lower 8 bits of the desired address to access the appropriate data entry in the cache data RAM 32. The cache controller 36 includes internal latches (not shown) according to the present invention which are used to latch the address signals, the byte enable signals and some control signals on the host bus 20 during read and write snoop cycles to guarantee that the cache controller 36 will have access to these signals for snooping purposes.

The latchable transceiver 64 and the internal latches enable the cache controller 36 to preserve the state of a host bus cycle. This allows the cache controller 36 more time to snoop the cycle. The cache controller 36 preferably latches the state of a host bus cycle early in the cycle due to the effects of pipelining on the host bus 20. Otherwise, the state of the host bus cycle is subject to change before the cycle is completed. In the preferred embodiment, the internal latches latch the address currently on the host bus 20 on each host bus cycle, and the latchable transceivers 64 latch data from the host bus 20 when a snoop write cycle is present on the host bus 20.

Figure 3:
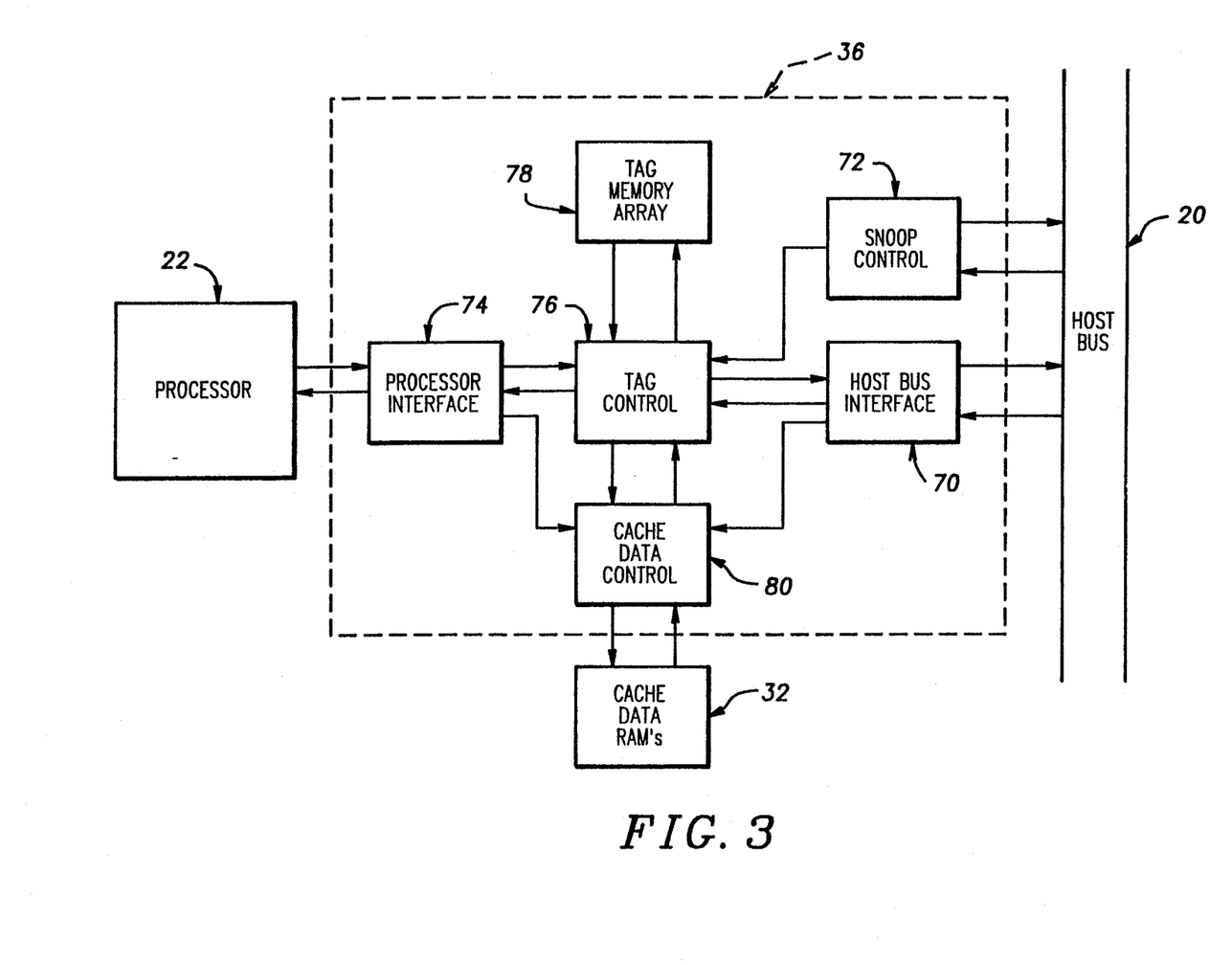
FIG. 3 is a schematic block diagram of the cache controller of FIG. 2.

Referring now to FIG. 3, a block diagram of the cache controller 36 of the present invention is shown. The cache controller 36 includes a host bus interface 70 and a snoop control 72 connected to the host bus 20. The host bus interface 70 includes the internal latches which latch the address signals on the host bus 20 during snoop cycles according to the present invention. The cache controller 36 includes a processor interface 74 connected to the processor 22. The host bus interface 70 and processor interface 74 are each connected to a tag control block circuit 76. The tag control circuit 76 is connected to a tag memory array 78 where the tag RAM's are located. The tag control block circuit 76 controls the operation of the tag RAM's in the tag memory array 78. A cache data control block circuit 80 is connected to the processor interface 74, the host bus interface 70 and the tag control 76. The cache data control block circuit 80 is connected to the cache data RAM 32 and controls the flow of data into and out of the cache 32. The cache data control block circuit 80 includes logic (FIG. 4) according to the present invention which controls the operation of the latchable transceivers 64.

The tag RAM's in the preferred embodiment are preferably time multiplexed between processor cycles and host bus snoop cycles. Therefore, only one of either a processor cycle or a host bus snoop cycle has access to the tag RAM's at any one time. For this reason, the internal latches in the host bus interface 70 latch the A<31:2> signals, the BE<3:0>* signals and the control signals MIO, DC and WR from the host bus 20 on all snoop read and write cycles, i.e. all host bus cycles. The internal latches include latch inputs which receive a latch enable signal referred to as HALEN*. The HALEN* signal is asserted low to latch the address and control signals into the internal latches from the host bus 30 on all snoop write and snoop read cycles. The A<31:2> signals and the BE<3:0>* signals are latched to enable the cache controller to perform a tag compare cycle after these signals are no longer available on the host bus 20. The MIO, DC, and WR signals are latched to allow the cache controller 36 to decode the cycle that was on the host bus 20. In the preferred embodiment, host bus write cycles are generally zero wait state cycles which require 2 clock cycles, and host bus read cycles are generally 1 wait state cycles which require 3 clock cycles.

Figure 4:
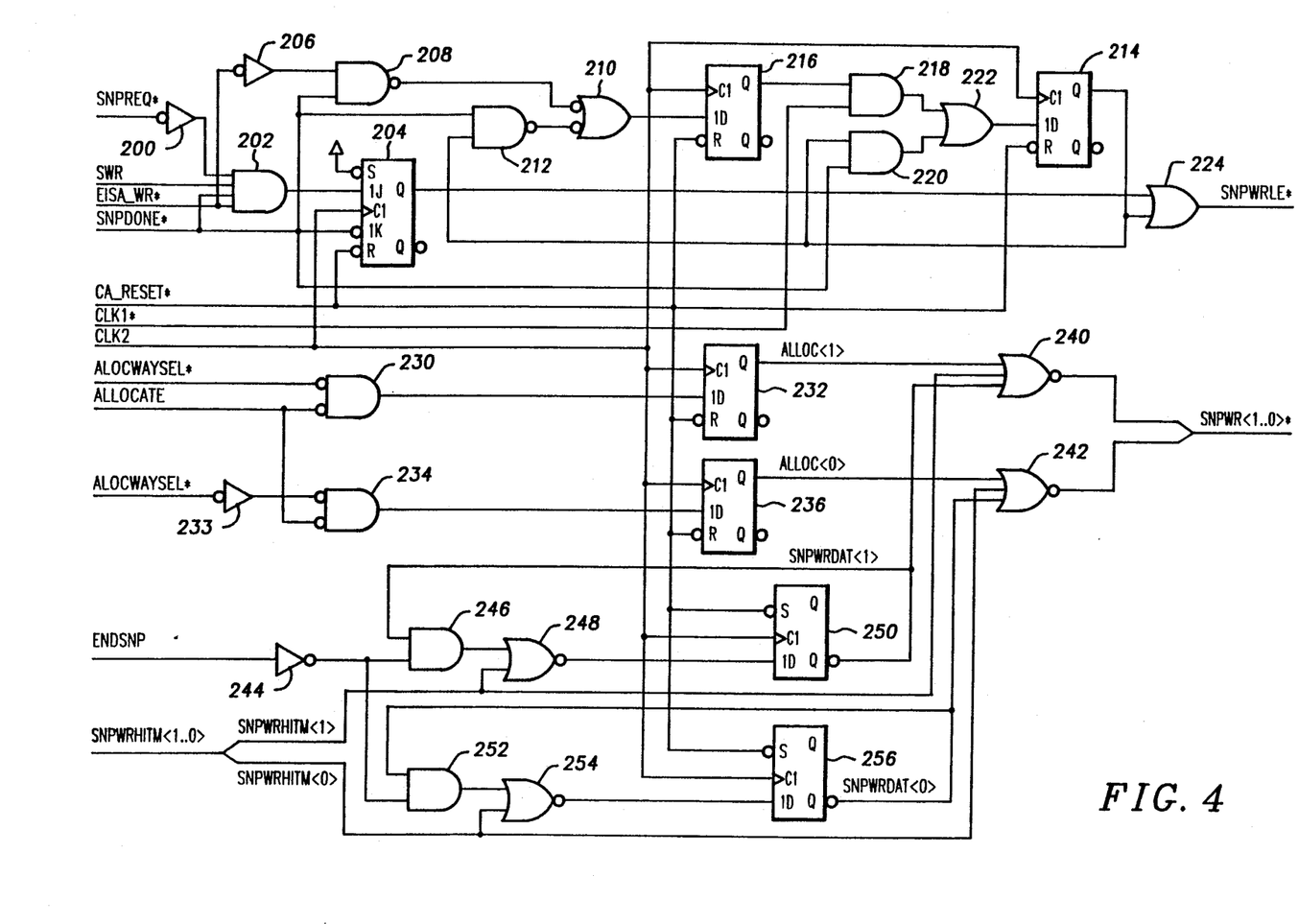
FIG. 4 is a schematic logic diagram of latchable transceiver control circuitry in the cache data control block of FIG. 3 according to the present invention.

Referring now to FIG. 4, the cache data control block 80 includes latchable transceiver control logic 40 according to the present invention which controls the latchable transceivers 64, enabling them to latch data during snoop write cycles to ensure that the cache controller 36 has access to this data in the case of a snoop write hit to a modified location. A discussion of the various signals used in the latchable transceiver control logic is deemed appropriate. In the discussion that follows, signal names followed by an asterisk (*) indicate that the signal is asserted when it has a logic low value. A signal referred to as SNPREQ decodes various snoop strobe signals on the host bus 20 and indicates, when asserted high, that the cache controller 36 should snoop the current host bus cycle. A signal referred to as SWR indicates whether a snoop cycle on the host bus 20 is a write cycle or a read cycle. The SWR signal is a logic high value for a write cycle and is a logic low value for a read cycle. A signal referred to as EISA_WR* indicates, when asserted low, that an EISA device is performing a write cycle on the host bus 20. A signal referred to as SNPDONE* indicates, when asserted low, that the respective cache controller's snoop access to the host bus 20 has completed. A signal referred to as CA_RESET* is asserted low to indicate that a cache reset is occurring. Signals referred to as CLK1 and CLK2 are system clocking signals generated by logic in the computer system S. The CLK1 signal mirrors the host bus clocking signal, which preferably operates at 33 Mhz in the preferred embodiment. The CLK2 preferably operates at twice the frequency of the CLK1 signal or 66 Mhz in the preferred embodiment. A signal referred to as ALOCWAYSEL* indicates which way is to be allocated during a cache read miss. The ALOCWAYSEL* signal is low when WAY 0 is to be allocated and is high when WAY 1 is to be allocated. A signal referred to as ALLOCATE* indicates, when asserted low, that a cache allocate cycle is occurring. A signal referred to as ENDSNP indicates, when asserted high, that a snoop cycle on the host bus 20 has completed. This signal is distinguished from the SNPDONE* signal referenced above, which is asserted low when a particular snoop access to a respective cache controller is completed. Signals referred to as SNPWRHITM<1..0> indicate that a snoop write hit to a modified location has occurred in WAY 1 or WAY 0, respectively.

FIG. 4 illustrates a schematic logic diagram of the latchable transceiver control circuitry which controls the transfer and latching of data from the host bus 20 to the cache 32. The logic operates to latch data from the host bus 20 during snoop write cycles and cache line allocate cycles. The latchable transceiver control logic includes D-type and JK flip-flops which latch data on the rising edge of the clocking signal received at their clock inputs. A different set of logic controls the transfer and latching of data from the cache 32 to the host bus 20, and this logic is omitted for simplicity.

The SNPREQ* signal is connected to the input of an inverter 200 whose output is connected to an input of a four input AND gate 202. The SWR signal, the EISA_WR* signal, and the SNPDONE* signal are connected to other inputs of the AND gate 202. The output of the AND gate 202 is connected to the J input of a JK flip-flop 204. The SNPDONE* signal is connected to the inverted K input of the flip-flop 204. The clock input of the flip-flop 204 receives the CLK2 signal. The CA_RESET* signal is connected to the inverted reset input of the flip-flop 204. The inverted set input of the flip-flop 204 is connected to a logic high value. The EISA_WR* signal is connected to the input of an inverter 206 whose output is connected to an input of a two input NAND gate 208. The SNPDONE* signal is connected to the other input of the NAND gate 208. The output of the NAND gate 208 is connected to the input of a two input NAND gate 210. The SNPDONE* signal is connected to an input of a two input NAND gate 212. The other input of the NAND gate 212 receives a signal from the Q output of a D-type flip-flop 214. The output of the NAND gate 212 is connected to the other input of the NAND gate 210. The output of the NAND gate 210 is connected to the D input of a D-type flip-flop 216. The CA_RESET* signal is connected to the inverted reset input of the flip-flop 216. The CLK2 signal is connected to the clock input of the flip-flop 216. The Q output of the flip-flop 216 is connected to an input of a two input AND gate 218. The CLKi* signal, which is an inverted version of the CLK1 signal, is connected to the other input of the AND gate 218. The Q output of the flip-flop 214 and the SNPDONE* signal are connected to the inputs of a two input AND gate 220. The outputs of the AND gates 218 and 220 are connected to the inputs of a two input OR gate 222. The output of the OR gate 222 is connected to the D input of the D-type flip-flop 214. The Q output of the flip-flop 214 and the Q output of the flip-flop 204 are connected to the inputs of a two input OR gate 224. The output of the OR gate 224 is a signal referred to as SNPWRLE*.

The SNPWRLE* signal is a snoop write latch enable signal that is provided from the cache controller 36 to latch enable inputs of the latchable transceivers 64 to enable the latchable transceivers 64 to latch data from the host bus 20. The latchable transceivers 64 operate such that when the SNPWRLE* is a logic low value, the latchable transceivers 64 are transparent and pass data from the host bus 20 to the cache data RAM 32. When the SNPWRLE* signal makes a low to high transition, each of the 32 bit latchable transceivers 64 latches the data currently on the host bus 20. The SNPWRLE* signal makes a low to high transition when either of the flip-flops 204 or 214 is set to a logic high value. The flip-flop 204 is set when the SNPREQ* signal is asserted low, indicating a snoop request, a write cycle is occurring on the host bus 20 that is not being performed by an EISA device, and the SNPDONE* signal is negated high, indicating that the current snoop access has not yet completed. When these conditions are true, the AND gate 202 sets the JK flip-flop 204 on the next rising edge of the CLK2 signal, thereby forcing the SNPWRLE* signal to make a low to high transition. The SNPWRLE* signal also makes a low to high transition two CLK2 signal cycle rising edges after an EISA device begins a write cycle on the host bus 20, as shown by the NAND gate 208 setting the flip-flops 216 and 214. This ensures that the latchable transceivers 64 latch data written by an EISA device to main memory 40. The logic which generates the SNPWRLE* signal includes various feedback through the NAND gate 212 and the AND gate 220 to provide that the SNPWRLE* signal remains a logic high value for two CLK2 signal cycle rising edges after the SNPDONE* signal is asserted low when an EISA device is performing a write cycle on the host bus 20.

The ALOCWAYSEL* signal and the ALLOCATE* signal are connected to the inputs of a two input NOR gate 230 whose output is connected to the D input of a D-type flip-flop 232. The ALOCWAYSEL* signal is connected to the input of an inverter 233 whose output is connected to an input of a two input NOR gate 234. The ALLOCATE* signal is connected to the other input of the NOR gate 234. The output of the NOR gate 234 is connected to the D input of a D-type flip-flop 236. The CA_RESET* signal is connected to the inverted reset inputs of each of the flip-flops 232 and 236. The CLK2 signal is connected to the clock inputs of each of the flip-flops 232 and 236. The Q output of the flip-flop 232 is a signal referred to as ALLOC<1>, which indicates, when asserted high, that WAY 1 in the cache is to be allocated with data from main memory 40. The ALLOC<1> signal is connected to an input of a three input NOR gate 240. The Q output of the flip-flop 236 is a signal referred to as ALLOC<0>, which indicates, when asserted high, that WAY 0 is to be allocated with data. The ALLOC<0> signal is connected to an input of a three input NOR gate 242. The ENDSNP signal is connected to the input of an inverter 244 whose output is connected to an input of a two input AND gate 246. The second input of the AND gate 246 receives a signal referred to as SNPWRDAT<1>. The SNPWRDAT<1> signal is asserted high on the rising edge of the CLK2 signal after the SNPWRHITM<1> signal is asserted high. The output of the AND gate 246 and the SNPWRHITM<1> signal are connected to the inputs of a two input NOR gate 248. The output of the NOR gate 248 is connected to the D input of a D-type flip-flop 250.

The output of the inverter 244 and a signal referred to as SNPWRDAT<0> are connected to the inputs of a two input AND gate 252. The SNPWRDAT<0> signal is asserted high on the rising edge of the CLK2 signal after the SNPWRHITM<0> signal is asserted high. The output of the AND gate 252 and the SNPWRHITM<0> signal are connected to the inputs of a two input NOR gate 254. The output of the NOR gate 254 is connected to the D input of a D-type flip-flop 256. The CA_RESET* signal is connected to inverted set inputs of each of the flip-flops 250 and 256. The CLK2 signal is connected to the clock inputs of each of the flip-flops 250 and 256. The inverted Q outputs of the flip-flops 250 and 256 are the SNPWRDAT<1> signal and the SNPWRDAT<0> signals, respectively. The SNPWRHITM<1> signal and the SNPWRDAT<1> signal are connected to the other inputs of the NOR gate 240. The SNPWRHITM<0> signal and the SNPWRDAT<0> signal are connected to the other inputs of the NOR gate 242. The outputs of the NOR gates 240 and 242 produce signals referred to as SNPWR<1>* and SNPWR<0>* respectively. The SNPWR<1..0>* signals are provided to the latchable transceivers 64 to control which of the 32 bit latchable transceivers 64 are enabled to output data, depending on the respective cache way in which the snoop write hit to the modified location occurred.

Therefore, when either the SNPWRHITM<1> signal or SNPWRHITM<0> signal is asserted, the respective flip-flop 250 or 256 outputs a logic 1 value on its inverted Q output to assert the SNPWR<1>* signal or the SNPWR<0>* signal, respectively. The SNPWRDAT<1> and SNPWRDAT<0> signals are fed back through the logic to the respective AND gates 246 and 252 to maintain the respective SNPWR<1>* or SNPWR<0>* signal asserted until the ENDSNP signal is asserted, which indicates that the snoop cycle on the host bus has completed. The ALLOC<1> and ALLOC<0> signals assert the respective SNPWR<1>* or SNPWR<0>* signal after a cache read miss when a respective cache way has a line allocated for data to be received from main memory 40. In the preferred embodiment, the SNPWRLE* signal is asserted before either of the SNPWR<1..0>* signals during a snoop write cycle to latch data from the host bus 20 to each of the latchable transceivers 64. If a snoop write hit to a modified location occurs, then one of either the SNPWR<1..0>* signals is asserted to enable the outputs of the respective latchable transceiver to output data to the respective cache way where the snoop write hit occurred.

Figure 5:
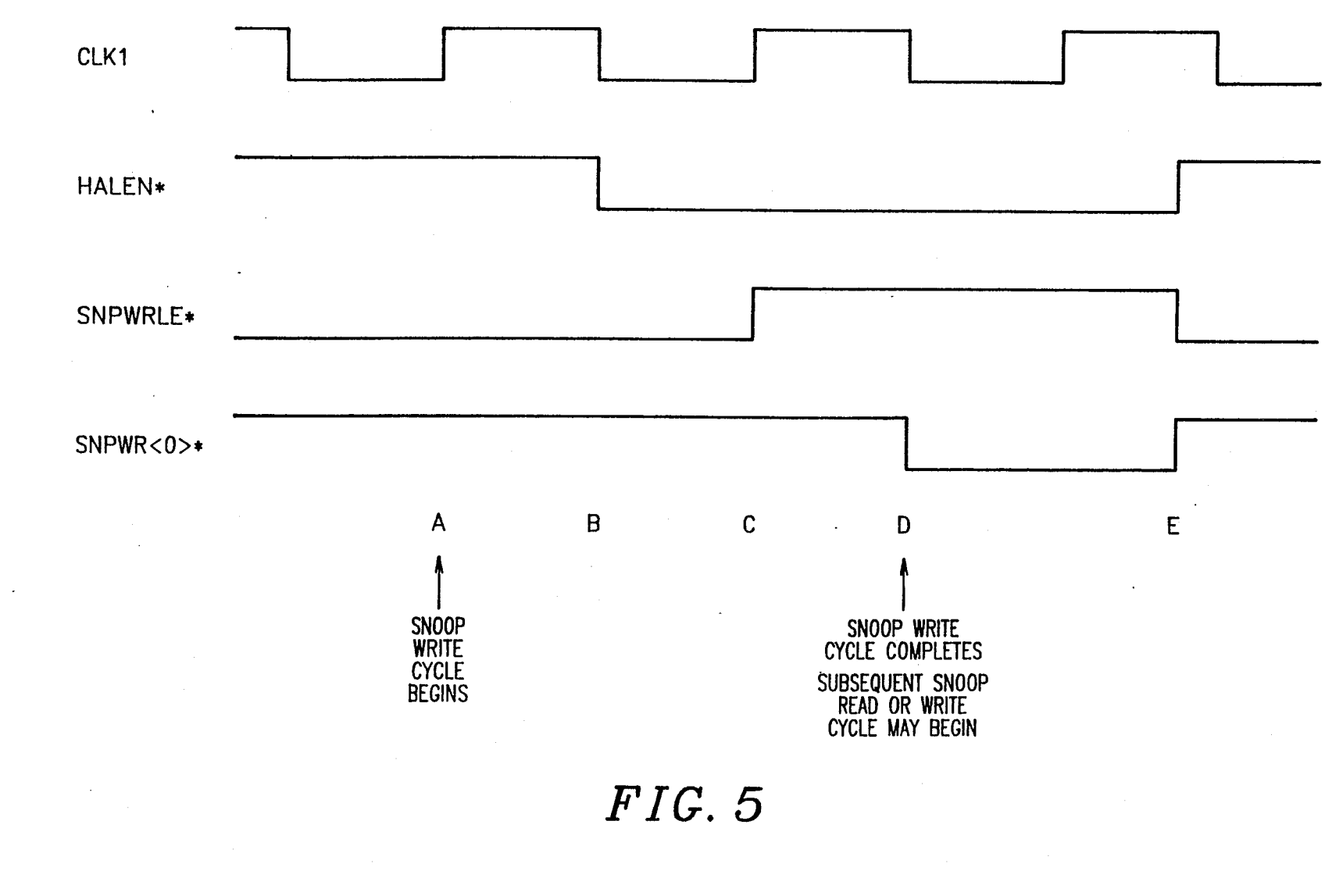
FIG. 5 is a timing diagram of the latchable transceiver control circuitry of FIG. 4.

Referring now to FIG. 5, a timing diagram which illustrates the operation of the latchable transceiver control logic is shown. The timing diagram is shown with reference to the CLK1 signal, which mirrors the host bus clocking signal in the preferred embodiment. Here it is assumed that a snoop write cycle begins occurring on the host bus 20 at point A, as shown. At point A, the HALEN* signal is negated high, the SNPWR<0>* signal is negated high, and the SNPWRLE* signal is logic low value. The HALEN* signal is asserted low on the next falling edge of the CLK1 signal at point B to enable the internal latches to latch the address and control signals from the host bus 20, as was explained above. The SNPWRLE* signal makes a low to high transition on the subsequent rising edge of the CLK1 signal at point C, as shown. This latches the current data values on the host bus 20 into each of the two 32 bit latchable transceivers 64. Also, at point C the cache controller 36 utilizes the latched address and control signals to perform a tag compare cycle in order to determine whether the cycle is a snoop write hit or a snoop write miss. On the subsequent falling edge of the CLK1 signal at point D, the snoop write cycle completes on the host bus 20. The SNPWR<0>* signal is also asserted low at point D. Here it is assumed that a snoop write hit to a modified location in WAY 0 was determined to have occurred at point C. In this instance, the SNPWR<0>* signal remains asserted low until after point D to allow the data stored in the latchable transceiver 64 to be stored in the appropriate address entry in the respective way of the cache. The SNPWR<0>* signal is asserted low at point D to enable the outputs of the 32 bit latchable transceiver corresponding to WAY 0 to output its data to cache WAY 0. If a write miss is determined to have occurred at point C, then the HALEN* and SNPWRLE* signals are each negated high at point D. At point D another snoop write or snoop read cycle may begin. If a subsequent snoop write or snoop read cycle begins at point D, then host bus delay logic according to the present invention delays the cycle on the host bus 20 on the next rising edge of the CLK1 signal. This guarantees that the cache controller 36 can snoop the first snoop write cycle before a subsequent cycle completes on the host bus 20. If a subsequent cycle does not begin at D, then no delay of the host bus 20 is generally necessary. When any necessary delay period is completed, or if a subsequent cycle does not begin at point D, then at point E the SNPWR<0>* signal is negated high, the HALEN* is negated high and the SNPWRLE* goes low in anticipation of the next cycle. The cycle then proceeds as in the previously described cycle. The operation of the host bus delay logic is explained below.

Figure 6:
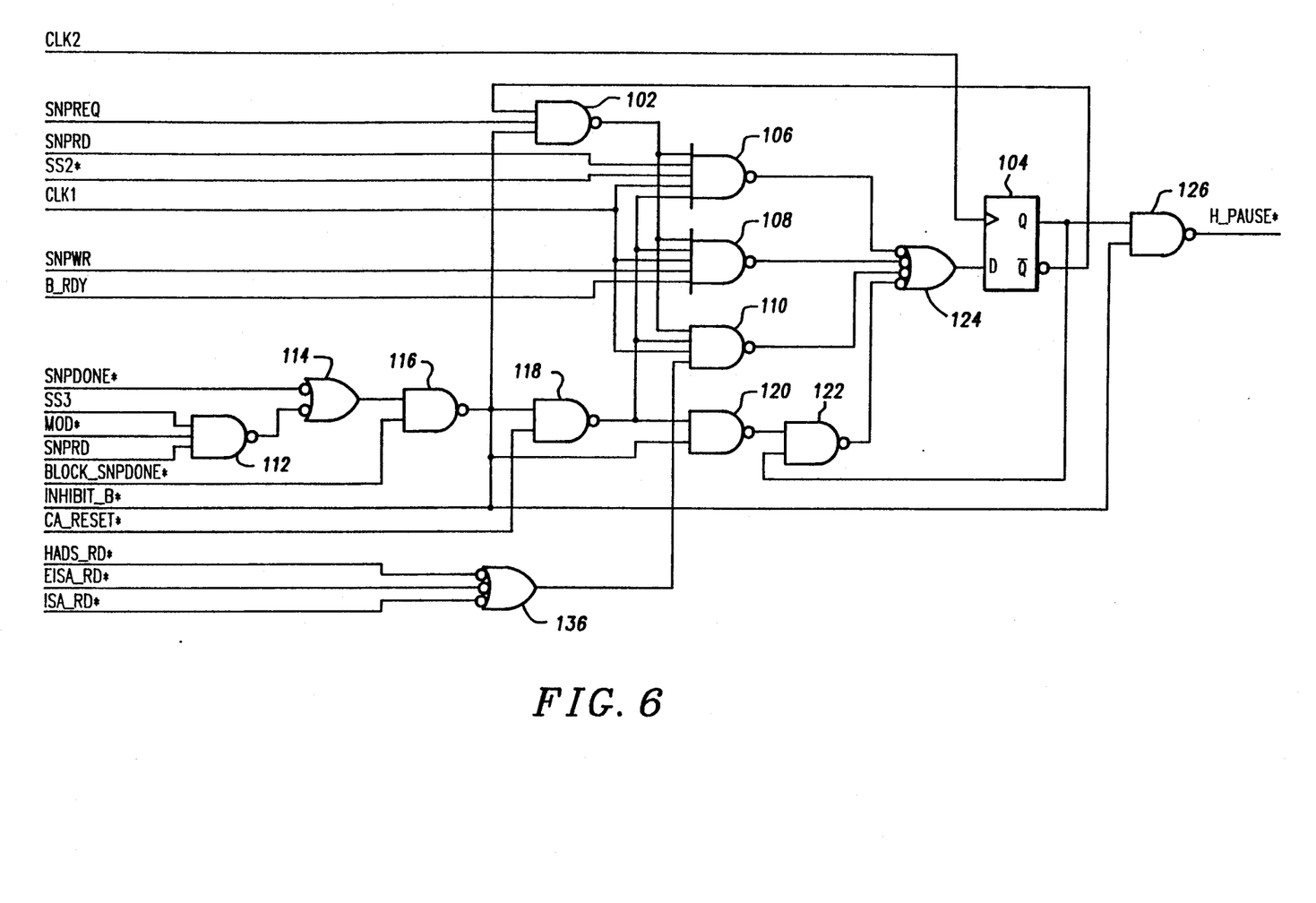
FIG. 6 is a schematic logic diagram of host bus pause circuitry in the tag control block of FIG. 3 according to the present invention.

Referring now to FIG. 6, the tag control block 76 includes host bus delay logic according to the present invention which can delay a host bus cycle and prevent the cycle from completing until the cache controller 36 has been able to snoop that access. A discussion of the various signals used in the host bus delay logic is deemed appropriate. A signal referred to as SNPRD indicates, when asserted high, that another device is performing a read operation on the host bus 20. A signal referred to as SS2* is a cache controller state signal that indicates, when asserted low, that the cache controller 36 is currently snooping the host bus 20. The SS2* signal is negated high when the cache controller is not snooping the host bus 20. A signal referred to as SNPWR indicates, when asserted high, that another device is performing a write operation on the host bus 20. A signal referred to as B_RDY, which is generated by the cache controller 36 in response to the asserted ready signal from the memory controller 42, indicates, when asserted high, that the host bus 20 has completed its current cycle. A signal referred to as SS3 is a cache controller state signal that indicates, when asserted high, that the cache controller 36 has completed a snoop access to the host bus 20 and is now performing a tag update. A signal referred to as MOD* indicates, when asserted low, that a data location in the cache has been modified and is therefore owned by the cache system 26. A signal referred to as BLOCK_SNPDONE* indicates, when asserted low, that back to back host bus cycles requiring a snoop access have occurred on the host bus. The BLOCK_SNPDONE* signal is asserted when a second snoop request occurs after a first snoop access has completed. A signal referred to as INHIBIT_B* indicates, when asserted low, that the cache controller 36 is the owner of a data location that must be supplied to a requesting device on a host bus read cycle. A signal referred to as HADS_RD* is asserted low to indicate that another host cache controller or bus master has requested a host bus read cycle. A signal referred to as EISA_RD* indicates, when asserted low, that an EISA device located on the EISA bus 50 is performing a host bus read cycle. A signal referred to as ISA_RD* indicates, when asserted low, that an ISA bus master located on the EISA bus 50 is performing a host bus read cycle.

The SNPREQ signal and the INHIBIT_B* signal are connected to inputs of a three input NAND gate 102. The third input to the NAND gate 102 receives the inverted Q output of a D-type flip-flop 104. The output of the NAND gate 102 is connected to an input of a five input NAND gate 106. The SNPRD signal, the SS2* signal, and the CLK1 signal are connected to other inputs of the NAND gate 106.

The SS3 signal, the MOD* signal, and the SNPRD signal are connected to the inputs of a three input NAND gate 112 whose output is connected to one input of a two input NAND gate 114. The SNPDONE* signal is connected to the other input of the NAND gate 114. The output of the NAND gate 114 and the BLOCK_SNPDONE* signal are connected to the inputs of a two input NAND gate 116. The output of the NAND gate 116 and the CA_RESET* signal are connected to inputs of a two input NAND gate 118. The output of the NAND gate 118 is connected to an input of the NAND gate 106.

The output of the NAND gate 102, the output of the NAND gate 118, the CLK1 signal, the SNPWR signal, and the B_RDY signal are connected to the inputs of a five input NAND gate 108. The output of the NAND gate 102, the output of the NAND gate 118, and the CLK1 signal are connected to the inputs of a four input NAND gate 110. The HADS_RD* signal, the EISA_RD* signal, and the ISA_RD* signal are connected to the inputs of a three input NAND gate 136. The output of the NAND gate 136 is connected to an input of the four input NAND gate 110.

The output of the NAND gate 118 and the INHIBIT_B* signal are connected to the inputs of a two input NAND gate 120. The output of the NAND gate 120 is connected to an input of a two input NAND gate 122. The Q output of the D-type flip-flop 104 is connected to the other input of the NAND gate 122. The outputs of each of the NAND gates 106, 108, 110 and 122 are connected to inputs of a four input NAND gate 124.

The output of the NAND gate 124 is connected to the D input of the D-type flip-flop 104. The clock input of the flip-flop 104 receives the CLK2 signal. The Q output of the flip-flop 104 and the INHIBIT_B* signal are connected to the inputs of a two input NAND gate 126 whose output is a signal referred to as H_PAUSE*. The H_PAUSE* signal is provided through the host bus 20 to the memory controller 42 to prevent a host bus cycle from completing until the cache controller 36 has had an opportunity to snoop the host bus access according to the present invention. While the H_PAUSE* signal is asserted, the memory controller 42 is unable to assert its ready signal to an active device, thus delaying completion of the current host bus cycle.

Each of the NAND gates 106, 108, 110 and 122 represent various conditions for the assertion of the H_PAUSE* signal. When the output of one or more of the NAND gates 106, 108, 110 and 122 are asserted low, and the INHIBIT_B* signal is negated high, then the H_PAUSE* signal is asserted low. The asserted INHIBIT_B* signal prevents the H_PAUSE* signal from being asserted because this signal indicates that the cache controller 36 has completed a snoop access and has taken control of the host bus 20 to inhibit the current memory cycle and supply modified data to the requesting device.

The sequence of logic comprising gates 112, 114, 116 and 118 is a condition for the assertion of the H_PAUSE* signal in each of the NAND gates 106, 108, 110 and 122. This logic requires that the SNPDONE* signal be negated high, signifying that the current snoop access has not completed, and either of the SS3 signal, the MOD* signal, or the SNPRD signal be a logic low value. If the SS3, MOD*, and SNPRD signals are all logic high values, indicating the cache controller 36 has completed a snoop read to a non-modified data location and is now performing a tag update, then the H_PAUSE* signal is not asserted unless the BLOCK_SNPDONE* signal is asserted. In this instance, the H_PAUSE* signal need not be asserted because the snoop access has already completed. The BLOCK_SNPDONE* signal is asserted in certain situations to disable the effect of the SNPDONE* signal and allow the H_PAUSE* signal to be asserted. The BLOCK_SNPDONE* is asserted on the second of two back to back snoop accesses where the first snoop access has completed and the second snoop access cycle is still on the host bus 20. In this instance, the SNP_DONE* signal will be asserted because the first snoop access has completed. The BLOCK_SNPDONE* is asserted in this situation to prevent the SNPDONE* from disabling the H PAUSE* signal because a second snoop access is on the host bus 20 waiting to be snooped. The BLOCK_SPDONE* signal directs this logic to ignore the asserted SNPDONE* signal and enables the H_PAUSE* signal to be asserted to delay completion of the second snoop cycle until the cycle has been snooped. The CA_RESET* signal provided to the input of the NAND gate 118 disables the H_PAUSE* signal if a reset condition is occurring. The output of the NAND gate 118 is a condition for assertion of the H_PAUSE* signal in each of the NAND gates 106, 108, 110, and 122.

The NAND gate 102 generates a condition for the assertion of the H_PAUSE* signal that is included in each of the NAND gates 106, 108, and 110. The condition represented by the NAND gate 102 requires that the H_PAUSE* signal not already be asserted, a snoop request occur on the host bus 20, and the INHIBIT_B* signal be negated high, signifying that the cache controller 36 has not seized the host bus 20 to inhibit the current memory cycle. The CLK1 signal is also a condition for assertion of the H_PAUSE* signal in each of the NAND gates 106, 108, and 110 so that the H_PAUSE* signal is asserted synchronously on the host bus 20.

The condition represented by the NAND gate 106 asserts the H_PAUSE* signal when the conditions represented by the NAND gates 102 and 118 are true, the CLK1 signal is asserted, a host bus read cycle is occurring, and the cache controller 36 is not in state SS2, signifying that the cache controller 36 is not currently snooping the bus. The NAND gate 106 asserts the H_PAUSE* signal to begin delaying a snoop read cycle if the cycle has not been snooped by the time the CLK1 signal is asserted. The condition represented by the NAND gate 108 asserts the H_PAUSE* signal when the conditions represented by the NAND gates 102 and 118 are true, the CLK1 signal is asserted, a host bus write cycle is occurring, and the B_RDY signal is asserted, signifying that a host bus cycle has completed. The NAND gate 108 asserts the H_PAUSE* signal to begin delaying a subsequent cycle after a snoop write cycle if the write cycle has not been snooped by the time the CLK1 signal is asserted in the subsequent cycle.

The condition represented by the NAND gate 110 asserts the H_PAUSE* signal when the conditions represented by the NAND gates 102 and 118 are true, the CLK1 signal is asserted, and either another device on the host bus 20, an EISA device, or an ISA bus master device have requested a host bus read cycle. The condition represented by the NAND gate 122 maintains the H_PAUSE* signal asserted when the H_PAUSE* signal is already asserted, the condition represented by the NAND gate 118 is true, the CA_RESET* signal is negated high, and the INHIBIT_B* signal is negated high. The NAND gate 122 generally maintains the H_PAUSE* signal asserted until a snoop access has completed.

The cache controller 36 generally only delays a host bus cycle when it is already performing other tasks, such as servicing its local processor, and cannot snoop the host bus cycle immediately. When the cache controller 36 latches the state of the host bus 20 during a write cycle, it only begins to delay the host bus 20 after a subsequent cycle begins. In this manner, the current write cycle which needs to be snooped can complete on the host bus 20 before the cache controller 36 is forced to delay any cycles, thereby reducing the impact of snooping on host bus bandwidth. Once the snoop write cycle completes, and the cache controller 36 has still been unable to snoop the cycle, the cache controller 36 delays the completion of a subsequent cycle until the previous write cycle has been snooped. The cache controller 36 latches the state of the host bus 20 during a read cycle principally to preserve the state of the bus 20 throughout the remainder of the cycle due to the effects of pipelining. When the cache controller 36 latches a snoop read cycle, the cache controller 36 will delay the snoop read cycle and prevent the cycle from completing until it has been able to snoop the cycle. Snoop read cycles must be snooped before they complete because the cache system 26 may be the owner of a modified copy of data and thus may have to inhibit the memory cycle and supply the modified data to the requesting device. If the read cycle were allowed to complete before the cycle was snooped, then "outdated" data may be returned to the requesting device by main memory 40 and the system data would not be coherent.

Therefore, the cache controller 36 according to the present invention includes internal latches and a latchable transceiver 64 coupled to the host bus 20 which it uses to latch the state of a host bus cycle. This preserves the state of a host bus cycle and allows that cycle to continue. The cache controller 36 also includes logic which enables it to delay a host bus cycle until the cache controller 36 has had an opportunity to snoop the cycle.

In the case of a snoop read cycle, the cache controller 36 latches the address signals present on the host bus 20 and asserts the H_PAUSE* signal to prevent the cycle from completing until it has been able to snoop that access. In the case of a snoop write cycle, the cache controller 36 latches the address and data signals on the host bus 20 and only begins to delay the host bus 20 after a subsequent cycle begins. This provides a greater amount of time for the cache controller 36 to snoop the host bus cycle without delaying the host bus 20. Therefore, in the case of write cycles, only in the instance of back to back host bus write cycles which require a snoop access will the cache controller be forced to delay the completion of a host bus cycle.

The foregoing disclosure and description of the invention are illustrative and explanatory thereof, and various changes in the size, components, construction and method of operation may be made without departing from the spirit of the invention.

We claim:

1. A computer system having guaranteed cache controller snoop access, the computer system comprising:
   a host bus having a state when a cycle is executing;
   random access memory coupled to said host bus;
   one or more microprocessors coupled to said host bus; and
   at least one other device coupled to said host bus for performing cycles on said host bus;
   wherein, each of said microprocessors has an associated cache memory and cache controller coupled to said host bus for performing cycles on said host bus, each of said cache controllers snooping said host bus while other cache controllers and other devices are performing cycles on said host bus which require snooping, said cache controllers including:
   means coupled to said host bus for latching the state of said host bus during a host bus cycle; and
   means coupled to said latching means for snooping said host bus cycle from said latched host bus state after said host bus cycle is no longer present on said host bus.

2. The computer system of claim 1, wherein said snooping means snoops said latched host bus state after said host bus cycle has completed if said host bus cycle is a write cycle and said snooping means has not snooped said latched host bus state before said host bus cycle completes.

3. The computer system of claim 2, said cache controller further comprising:
   means coupled to said host bus and said snooping means for delaying completion of a subsequent cycle after a write cycle if said snooping means has not yet snooped said latched host bus state.

4. The computer system of claim 3, wherein said delaying means delays completion of said subsequent host bus cycle until said snooping means snoops said latched host bus state.

5. The computer system of claim 4, wherein the computer system further includes a memory controller coupled to said host bus and said random access memory for controlling accesses of said random access memory, and wherein the computer system includes a means coupled to the host bus which generates a ready signal to complete host bus cycles; and
   wherein said delaying means provides a signal to said ready signal generating means which prevents said ready signal generating means from generating said ready signal.

6. The computer system of claim 4, wherein said latched host bus state comprises data, control, and address signals having particular values.

7. The computer system of claim 1, wherein said host bus cycles are pipelined, wherein an address portion is provided prior to a data portion, and said host bus has a first state at the beginning of a host bus cycle and has a second state at the end of a host bus cycle;
   wherein said latching means latches said first host bus state at the beginning of said host bus cycle.

8. The computer system of claim 7, further comprising:
   means coupled to said host bus and said snooping means for delaying completion of said host bus cycle until said snooping means snoops said latched host bus state if said host bus cycle is a read cycle.

9. The computer system of claim 8, wherein the computer system includes a memory controller coupled to said host bus and said random access memory for controlling accesses of said random access memory, and wherein said memory controller generates a ready signal to complete each host bus cycle; and
   wherein said delaying means provided a signal to said memory controller which prevents said memory controller from generating said ready signal.

10. The computer system of claim 8, wherein said latched host bus state comprises only address and control signals if said host bus cycle is a read cycle.

11. A computer system having guaranteed cache controller snoop access, the computer system comprising:
    a host bus having a state when a cycle is executing;
    random access memory coupled to said host bus;
    multiple microprocessors coupled to said host bus for performing cycles on said host bus,
    wherein, each of said microprocessors have an associated cache memory and cache controller coupled to said host bus for performing host bus cycles, said cache controllers including:
    a snooping mechanism coupled to said host bus which snoops said host bus while other cache controllers and devices are performing cycles on said host bus which require snooping;
    tag memory coupled to said snooping mechanism and said associated microprocessor which is accessed by either said associated microprocessor or said snooping mechanism at any one time;
    means coupled to said host bus and said tag memory for delaying a host bus cycle if said tag memory is being accessed by said cache controller's associated microprocessor;
    means coupled to said snooping mechanism and said host bus for snooping said host bus cycle after said processor tag memory access is completed; and
    means coupled to said delaying means and said snooping means for allowing said host bus cycle to complete after said snooping means completes snooping said host bus cycle.

12. The computer system of claim 11, wherein the computer system further includes a memory controller coupled to said host bus and said random access memory for controlling accesses of said random access memory, and wherein said memory controller generates a ready signal to complete each host bus cycle; and
    wherein said delaying means provides a signal to said memory controller which prevents said memory controller from generating said ready signal.

* * * * *

UNITED STATES PATENT AND TRADEMARK OFFICE
CERTIFICATE OF CORRECTION

PATENT NO. : 5,335,335
DATED : August 2, 1994
INVENTOR(S) : Mike T. Jackson et al It is certified that error appears in the above-indentified patent and that said Letters Patent is hereby corrected as shown below:

In col. 17, ln. 37, please replace "including:" with --including;--.

In col. 18, ln. 35, before "for" please insert --; and at least one other device coupled to said host bus--.

Signed and Sealed this

Fourteenth Day of March, 1995

Attest:

BRUCE LEHMAN

*Attesting Officer*     *Commissioner of Patents and Trademarks*